United States Patent
Humenick et al.

(10) Patent No.: US 12,208,639 B2
(45) Date of Patent: Jan. 28, 2025

(54) SYSTEMS AND METHODS OF PYROMETRIC TEMPERATURE MEASUREMENT AND CONTROL IN DYE SUBLIMATION

(71) Applicant: Sekisui Kydex LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: Sekisul Kydex, LLC, Bloomsburg, PA (US)

( * ) Notice: Subject to any disclaimer, the term of this patent is extended or adjusted under 35 U.S.C. 154(b) by 149 days.

(21) Appl. No.: 17/950,879

(22) Filed: Sep. 22, 2022

(65) Prior Publication Data
US 2023/0099630 A1    Mar. 30, 2023

Related U.S. Application Data

(60) Provisional application No. 63/248,920, filed on Sep. 27, 2021.

(51) Int. Cl.
| | | |
|---|---|---|
| *B41M 5/382* | (2006.01) | |
| *G01J 5/00* | (2022.01) | |
| *G01J 5/07* | (2022.01) | |

(52) U.S. Cl.
CPC .......... *B41M 5/382* (2013.01); *G01J 5/0003* (2013.01); *G01J 5/07* (2022.01)

(58) Field of Classification Search
CPC .... B41M 5/382; B41M 5/0358; G01J 5/0003; G01J 5/07; G01J 5/025; B41F 16/00
See application file for complete search history.

(56) References Cited

U.S. PATENT DOCUMENTS

| | | |
|---|---|---|
| 4,462,852 A | 7/1984 | Custor |
| 5,432,145 A | 7/1995 | Oshima et al. |
| (Continued) | | |

FOREIGN PATENT DOCUMENTS

| | | |
|---|---|---|
| WO | WO-2018/122854 A1 | 7/2018 |
| WO | WO-2020/162958 A1 | 8/2020 |
| WO | WO-2021/023145 A1 | 2/2021 |

OTHER PUBLICATIONS

International Search Report and Written Opinion on PCT Appl. Ser. No Ser. No. PCT/US2022/044190 dated Dec. 28, 2022 (11 pages).
(Continued)

*Primary Examiner* — Lisa Solomon
(74) *Attorney, Agent, or Firm* — Foley & Lardner LLP

(57) ABSTRACT

An illustrative heating section of a dye sublimation machine may utilize a plurality of configurable pyrometers. The pyrometers may take the corresponding temperature measurements remotely without interacting with any mechanical moving parts of the dye sublimation machine and therefore may be more robust against breakage. The pyrometers may be directed at the membrane covering the printed sheet and therefore may provide more accurate temperature measurements. Furthermore, the angular orientation of the pyrometers may be configured that may allow the pyrometers to dynamically measure the temperature of multiple spots in the heating section. In addition to the pyrometers in the heating section, a plurality of pyrometers may be provided to measure the temperature in the cooling section of the dye sublimation machine.

18 Claims, 6 Drawing Sheets

(56) References Cited

U.S. PATENT DOCUMENTS

| | | | |
|---|---|---|---|
| 5,644,351 | A | 7/1997 | Matsumoto et al. |
| 6,336,722 | B1 | 1/2002 | Wotton et al. |
| 6,796,647 | B2 | 9/2004 | Kosaka et al. |
| 2003/0035675 | A1 | 2/2003 | Emery et al. |
| 2003/0192136 | A1 | 10/2003 | Magee et al. |
| 2005/0070434 | A1 | 3/2005 | Drake |
| 2011/0229664 | A1 | 9/2011 | Hoggard |
| 2012/0196085 | A1 | 8/2012 | Langan et al. |
| 2012/0261850 | A1* | 10/2012 | Simon .................. B29C 49/786 264/40.6 |
| 2015/0028094 | A1 | 1/2015 | Will et al. |
| 2015/0029289 | A1 | 1/2015 | Rosner et al. |
| 2016/0114593 | A1 | 4/2016 | Ume |
| 2016/0290718 | A1 | 10/2016 | Ye et al. |

OTHER PUBLICATIONS

Invitation to Pay Additional Fees on PCT Appl. Ser. No. PCT/US2022/044098 dated Nov. 29, 2022 (3 pages).
International Search Report and Written Opinion on PCT App. PCT/US2022/044098 dated Jan. 31, 2023 (20 pages).
International Preliminary Report on Patentability for PCT App. PCT/US2022/044098 dated Apr. 2, 2024 (10 pages).

* cited by examiner

200

400

500

506

SYSTEMS AND METHODS OF PYROMETRIC TEMPERATURE MEASUREMENT AND CONTROL IN DYE SUBLIMATION

CROSS-REFERENCE TO RELATED APPLICATIONS

This application claims the benefit of and priority to U.S. Provisional Application No. 63/248,920, filed on Sep. 27, 2021, the entire disclosure of which is incorporated by reference herein.

TECHNICAL FIELD

This application is directed generally towards a dye sublimation apparatus and more specifically towards pyrometric temperature measurement and control during a dye sublimation process.

BACKGROUND

Dye sublimation is a process of infusing images to a substrate. An image to be infused is printed on a paper (or any type of sheet) using sublimation dyes (contained in the sublimation inks) and the printed paper is pressed against a substrate (generally a thermoplastic material) under heat. The heat causes the dyes to sublimate from a solid state on the printed paper to a gaseous state to travel to the substrate, where the dyes are deposited as solids. This sublimation process therefore infuses the image in the printed paper into the substrate. As the infused image is embedded into substrate, the image may not chip, fade, or delaminate like capped and printed images.

A dye sublimation apparatus may have a heating section to generate the heat for sublimating the dyes such that the dye can travel from the printed paper (or printed sheet) into the substrate. For example, FIG. 1 shows a conventional heating section 100 of a conventional dye sublimation apparatus. As shown, the heating section 100 includes a bank of heaters 102 containing individual heaters 102a, 102b, 102c, 102d. The bank of heaters may generate a radiating heat 106 to heat a printed sheet 104. A thermocouple 108 measures the temperature within the heating section 100.

However, the conventional method of using a thermocouple 108 for temperature measurement in the heating section 100 has several technical shortcomings. The thermocouple 108, which is generally on a bed 110 that the printed sheet 104 is laid upon, includes a wire. The thermocouple 108 and the wire are not robust against mechanical wear and tear. For example, the thermocouple 108 and the wire assembly breaks every 30-60 days. Furthermore, the thermocouple 108 measures temperature at only one spot, e.g., at the back edge of the bed 110. The thermocouple 108 also does not accurately measure the temperature of the printed sheet 104 because the thermocouple 108 measures the temperature between the bed 110 and a membrane (not shown) covering the printed sheet 104 and not of the printed sheet 104 itself.

Therefore, the conventional temperature measurement using a thermocouple is mechanically non-robust, localized on just one spot within the heating section, and generally inaccurate. As such, a significant improvement upon temperature measurement within heating sections of dye sublimation machines is desired.

SUMMARY

What is therefore desired are dye sublimation systems and methods with more accurate, multi-spot, and mechanically robust temperature measurement. What is further desired are dye sublimation systems and methods that provide the temperature measurement of an area that contains a printed sheet itself (e.g., a membrane) as opposed a spot that does not contain the printed sheet.

Embodiments described herein attempt to solve the aforementioned technical problems and may provide other benefits as well. An illustrative heating section of a dye sublimation machine (also referred to as a dye sublimation apparatus) may utilize a plurality of configurable pyrometers. The pyrometers may take the corresponding temperature measurements remotely without interacting with any mechanical moving parts of the dye sublimation machine and therefore may be more robust against breakage. The pyrometers may be directed at the membrane covering the printed sheet and therefore may provide more accurate temperature measurements. Furthermore, the angular orientation of the pyrometers may be configured that may allow the pyrometers to dynamically measure the temperature of multiple spots in the heating section. In addition to the pyrometers in the heating section, a plurality of pyrometers may be provided to measure the temperature in the cooling section of the dye sublimation machine.

In one embodiment, a dye sublimation apparatus for infusing an image on a printed sheet to a substrate comprises a heating section configured to heat the printed sheet to sublimate one or more dyes forming the image, such that the one or more dyes travel into the substrate in a gaseous state and deposit into the substrate in a solid state to infuse the image into the substrate; the heating section comprising one or more heaters configured to radiate heat towards the printed sheet; and the heating section further comprising one or more pyrometers with individually configurable orientation to remotely measure temperature at corresponding one or more locations within the heating section.

In another embodiment, a dye sublimation method for infusing an image on a printed sheet to a substrate comprises heating, by a heating section of a dye sublimation apparatus, the printed sheet to sublimate one or more dyes forming the image such that the one or more dyes travel into the substrate in a gaseous state and deposit into the substrate in a solid state to infuse the image into the substrate, the heating section comprising one or more heaters configured to radiate heat towards the printed sheet; remotely measuring, by one or more pyrometers of the dye sublimation apparatus, temperature caused by the radiated heat at corresponding one or more locations within the heating section; and configuring, by a processor of the dye sublimation apparatus, angular orientation of each of the one or more pyrometers.

In yet another embodiment, dye sublimation apparatus for infusing an image on a printed sheet to a substrate comprises a heating section configured to heat the printed sheet to sublimate one or more dyes forming the image, such that the one or more dyes travel into the substrate in a gaseous state and deposit into the substrate in a solid state to infuse the image into the substrate; a cooling section comprising one or more cooling elements configured to cool the substrate; and the cooling section further comprising one or more pyrometers with individually configurable angular orientation to remotely measure temperature at corresponding one or more locations within the cooling section.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
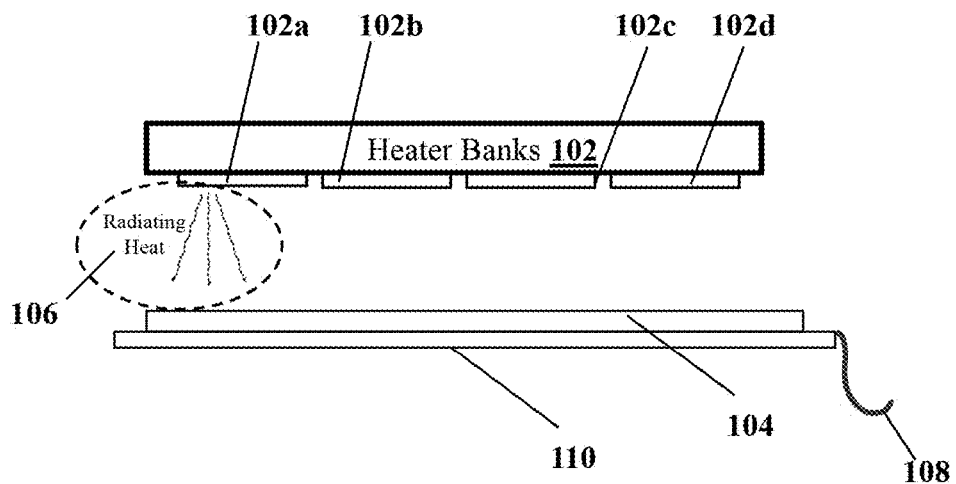
FIG. 1 shows an example of a heating section of a conventional dye sublimation apparatus.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part herein. Other embodiments may be used and/or other changes may be made without departing from the spirit or scope of the present disclosure. The illustrative embodiments described in the detailed description are not meant to be limiting of the subject matter presented here.

Embodiments disclosed herein describe an improved dye sublimation machine with a more accurate, flexible, and more robust temperature measurement. More specifically, the dye sublimation machine may utilize a plurality of pyrometers to remotely measure temperature of corresponding plurality of locations. As the plurality of pyrometers may not have mechanical interaction with moving parts of the dye sublimation machine, the pyrometers may be more robust and may last longer than the conventional thermocouples. Furthermore, the plurality of pyrometers may measure the temperature at plurality of locations on a membrane covering a printed sheet. Such measurement of temperature directly on the membrane may generate more accurate results than a conventional thermocouple measuring temperature on a bed edge. In addition, each of the plurality of pyrometers may have configurable angular orientation and therefore provide flexibility of changing the spots of which the temperature measurements are being taken.

Figure 2:
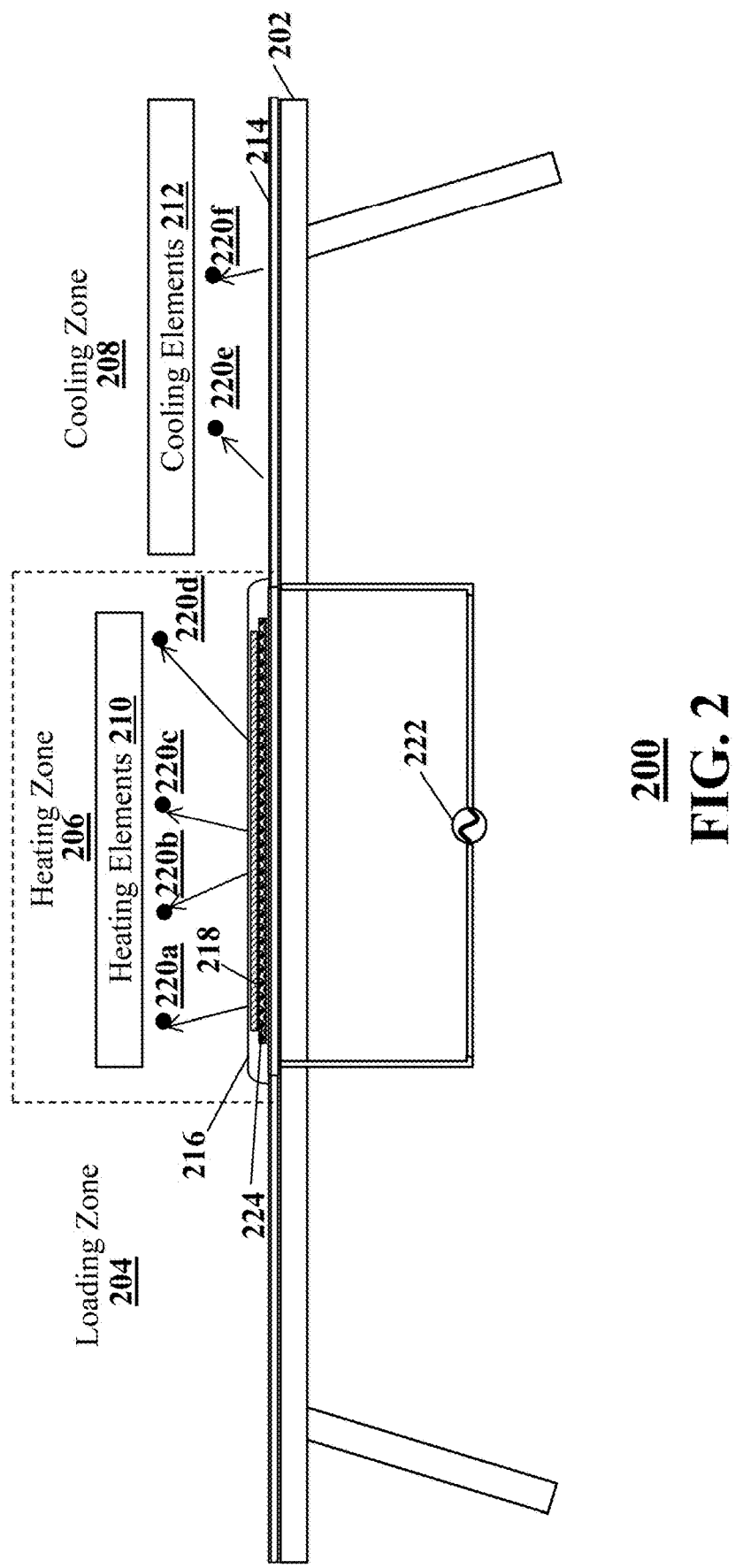
FIG. 2 shows an illustrative dye sublimation apparatus, according to an embodiment.

FIG. 2 shows an illustrative dye sublimation machine (also referred to as dye sublimation apparatus) 200, according to an embodiment. It should be understood that the dye sublimation machine 200 shown in FIG. 2 and described herein is merely for illustration and explanation and machines with other form factors and components should also be considered within the scope of this disclosure. For example, dye sublimation machines having additional, alternative, or a fewer number of components than the illustrative dye sublimation machine 200 should be included within the scope of this disclosure.

The dye sublimation machine 200 may comprise a sublimation table 202, which may provide structural support for the components of the dye sublimation machine 200. The dye sublimation machine 200 in general and the sublimation table 202 in particular may be divided into three zones: a loading zone (also referred to as a loading section) 204, a heating zone (also referred to as heating section) 206, and a cooling zone (also referred to as a cooling section) 208. The loading zone 204 may allow a worker (or a user) to load a printed sheet 218 and a substrate 224. The printed sheet 218 may have an image thereon printed using sublimation inks containing sublimation dyes. The substrate 224 may be of any type of material such as thermoplastic where the image may be infused through the dye sublimation process. The combination of the printed sheet 218 and the substrate 224 may be loaded onto a bed 214 at the loading zone 204. In some embodiments, the bed 214 may be formed by a graphite honeycomb structure. The bed 214 may be configured as a conveyer belt that moves through the loading zone 204, the heating zone 206, and the cooling zone 208.

The heating zone 206 may include heating elements 210. The heating elements 210 may be of any kind such as heating coils in any type configuration. The heating elements 210 may be electrically heated providing a radiative type heating to the combination of the printed sheet 218 and the substrate 224. For example, the heating elements 210 may be included in multiple electrical heaters, each heating a section of the combination of the printed sheet 218 and the substrate. The heating zone 206 and the cooling zone 208 may also include a plurality of pyrometers 220a, 220b, 220c, 220d, 220e, 220f (collectively or commonly referred to as 220) to measure the temperature of the heat generated by the heating elements 210. The heating elements 210 may be within individual heaters that may be individually controlled by one or more controllers. For example, a controller associated with a heater may receive a temperature measurements from the pyrometers 220 and determine the amount of heat to be radiated by the heater. The heating elements 210 may also be divided into a plurality of zones, each zone containing one or more heaters. Therefore, a corresponding controller may individually control the heat output of each zone to maintain a consistent temperature at the bed 214 within the heating zone 206. Within the heating zone 206, a membrane 216 may cover the combination of the printed sheet 218 and the substrate 224. The membrane 216 may be formed by any kind of material that may withstand the heat for repeated heating cycles in the heating zone 206. A vacuum pump 222 may pull down the membrane 216 such that the membrane 216 may cover the combination of the printed sheet 218 and the substrate 224 snugly without air bubbles.

The cooling zone 208 may cool down the combination of the printed sheet 218 and the substrate 224 after the dye sublimation process in the heating zone 206. The cooling zone 208 may include cooling elements 212 such as cold air blowers to expedite the cooling down process. However, it should be understood that the cooling zone 208 may not necessarily include the cooling elements 212 and the substrate 224 may cool down to ambient temperature without the aid of the cooling elements 212. The cooling zone 208 may also include a plurality of pyrometers 220e, 220f (also referred to as 220 commonly or collectively). A processor/controller attached to the cooling elements 212 may control the cooling elements based upon the temperature measurement of the plurality of pyrometers 220 in the cooling zone 208. It should also be understood that the loading zone 204 and the cooling zone 208 may be combined in some embodiments. In these embodiments, the combination of the printed sheet 218 and the substrate 224 may be placed on the combined zone providing both loading cooling functionality, be moved to the heating zone 206, and moved back to the combined zone for cooling. Therefore, it should generally be understood that the configuration of FIG. 2 is merely illustrative and alternative configurations should also be considered within the scope of this disclosure.

In an illustrative operation, a worker may place the substrate 224 on the loading zone 204 and place the printed sheet 218 directly on the substrate 224. The bed 214 may be configured as a conveyer belt, which may move the combination of the printed sheet 218 and the substrate 224 to the heating zone 206. The heating zone 206 may be a covered area within the dye sublimation machine 200. Within the heating zone 206, the vacuum pump 222 may pull a vacuum between the membrane 216 and the bed 214 such that the membrane 216 presses down on the printed sheet 218. The heating elements 210 may generate a requisite amount heat to sublimate the ink on the printed sheet 218. The sublimated ink may then be deposited into the substrate 224. The pyrometers 220 may measure the temperature at different spots within the enclosure created by the membrane 216 and the bed 214 and the temperature measurements may be used by the heating elements to regulate the generated heat. After the combination of the printed sheet 218 and the substrate 224 are left in the heating zone 206 for a requisite amount of time (e.g., based upon the properties of the substrate 224), the combination of the printed sheet 218 and the substrate 224 is moved to the cooling zone. As described above, the loading zone 204 may also function as the cooling zone 208. The cooling process in the cooling zone 208 may be expedited by the cooling elements 212, which may provide an active source of cooling such as a flow of cold air. After the combination of the printed sheet 218 and the substrate 224 is sufficiently cooled, the combination is removed from the dye sublimation machine 200. After this process, the image in the printed sheet 218 may be infused (or deposited) into the substrate 224.

The pyrometers 220 at each of the heating zone 206 and the cooling zone 208 may have configurable angular orientation. A processor (used broadly to include any type of microprocessors and controllers) may configure the angular orientations of the pyrometers 220 to measure temperature at different spots throughout the dye sublimation process. For example, the processor may dynamically adjust the angular orientation (also referred to as orientation) of the pyrometers 220 as the printed sheet 218 moves through the heating zone 206 and the cooling zone 208.

Figure 3:
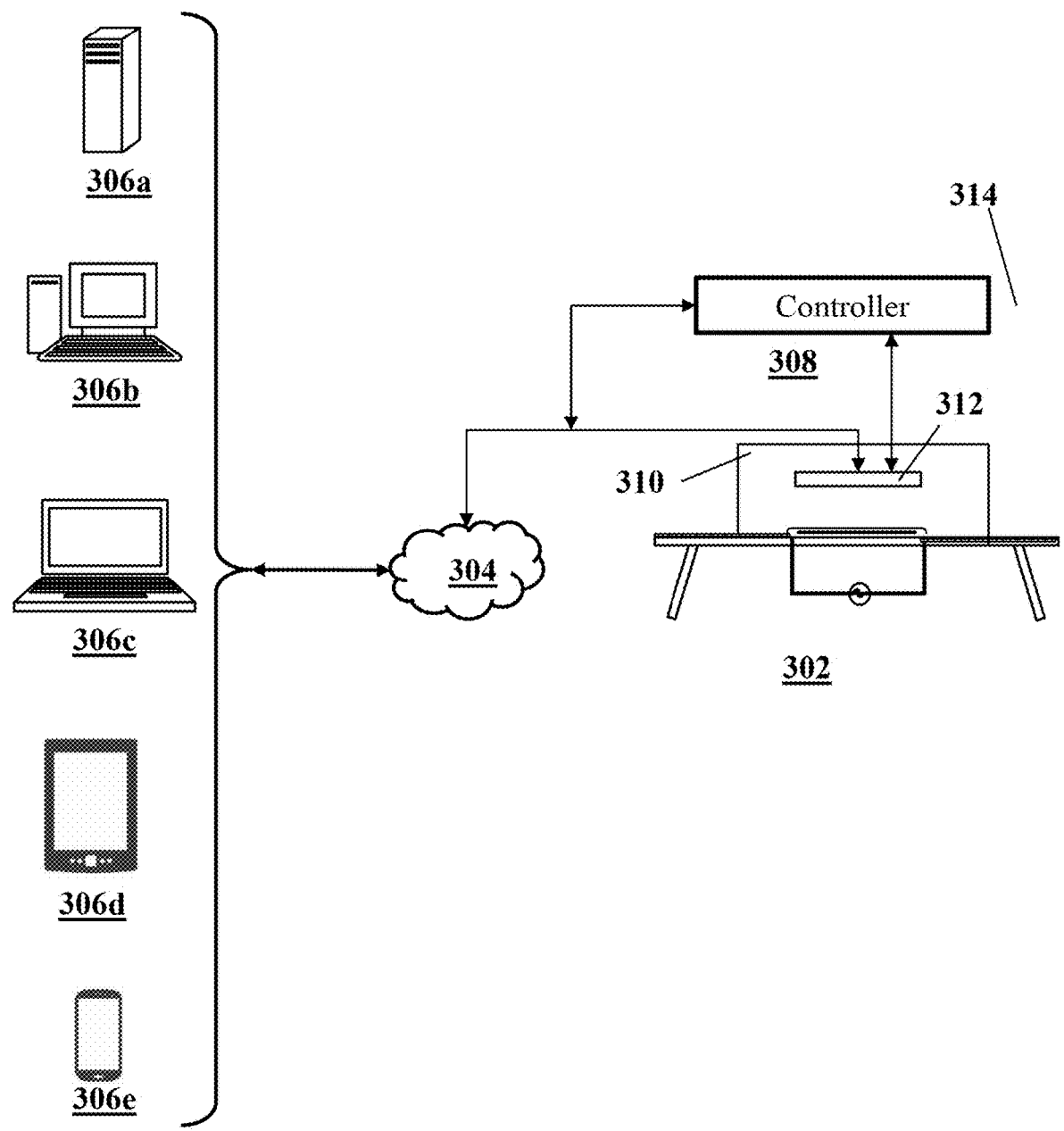
FIG. 3 shows an illustrative system for dye sublimation, according to an embodiment.

FIG. 3 shows an illustrative system 300 for dye sublimation, according to an embodiment. As shown, the system 300 may comprise a dye sublimation apparatus (also referred to as a dye sublimation machine) 302, a network 304, computing devices 306a, 306b, 306c, 306d, 306e (collectively or commonly referred to as 306), and a controller 308. It should be understood that the system 300 and the aforementioned components are merely for illustration and systems with additional, alternative, and a fewer number of components should be considered within the scope of this disclosure.

The dye sublimation apparatus 302 may be a combination of components that may infuse (or dye sublimate) an image from a printed sheet to a substrate. The image may be printed using sublimation inks containing sublimation dyes that may transform from solid state to gaseous state when heated to a predetermined temperature. The sublimation dyes may travel into the substrate and deposit thereon thereby creating an infused image into the substrate. For the heating part of the dye sublimation process, the dye sublimation apparatus 302 may include a heating section (also referred to as heating zone) 310. The heating section may generally be enclosed for temperature control and to preempt the heat escaping the dye sublimation apparatus 302. The heating section 310 may include a bank of heaters 312, which may be organized into different zones with each zone containing one or more heaters.

The bank of heaters 312 may be controlled by a controller 308. The single controller 308 is shown merely for illustration and there may be a plurality of controllers 308 controlling the bank of heaters (also referred to as heater banks) 312. More particularly, the controller 308 may regulate the heat generated by each zone (containing one or more heaters) individually. For example, the controller 308 may increase the heat, decrease the heat, turn ON, or turn OFF the heat generated by a zone by controlling the corresponding heater. The controller 308 may be any kind of hardware and/or software controller, including, but not limited to PID (proportional-integral-derivative) controller and/or any other type of controller. The controller 308 may continuously receive a feedback from the items being heated (e.g., printed sheet, substrate) through a connection 314. The connection 314 may be wired, e.g., a wired connection from a plurality of pyrometers providing the feedback to the controller 308, or wireless, e.g., a plurality of pyrometers wirelessly providing the feedback to the controller 308.

In addition to the controller 308, the bank of heaters 312 may be controlled based upon instructions provided by a computing device 306. For example, the computing device 306 may include an interface for a user to enter a desired amount of bed temperature in the heating zone 310 for a particular image and the computing device 306 may provide instructions to the bank of heaters 312 through the network 304 to maintain the temperature. Alternatively or additionally, the computing device 306 may provide the instruction to maintain the temperature to the controller 308. In some embodiments, the computing device 306 may provide instructions to the bank of heaters 312 to maintain a first temperature at a first stage of the dye sublimation process and to maintain a second temperature at a second stage of the dye sublimation process. It should be understood that the instructions to maintain the temperature and the process of maintaining the temperature may be maintained either in hardware, e.g., through the controller 308, or as a combination of hardware and software, e.g., through one or more applications in the computing device 306, the controller 308, and/or other hardware components in the dye sublimation apparatus. In some embodiments, the controller 308 may sequentially activate the heaters in the bank of heaters 312. For example, the dye sublimation process may require a gradual ramping up of the heat and therefore the sequential activation may allow heat to build up to a desired temperature. As another example, activating the heaters at the periphery of the heating section 310 first may allow a controller to determine an amount of heat (generally lesser than the heaters at the periphery) to be generated by heaters at the center of the heating section 310 to maintain a desired temperature within the heating section 310.

As described above, the temperature sensors in the heating section 310 may be a plurality of pyrometers. The plurality of pyrometers may be oriented towards various spots within the heating section 310 to measure the corresponding temperature. In some embodiments, the controller 308 and/or the computing devices 306 may configure (e.g., adjust) the angular orientation of the pyrometers to dynamically measure temperature of different spots. In addition to the heating section 310, the dye sublimation apparatus may also include one or more pyrometers to measure temperature in the cooling section as well.

The computing devices 306 may include any type processor based device that may execute one or instructions (e.g., instructions to cause a uniform temperature distribution in the heating section 310) to the dye sublimation apparatus 302 through the network 304. Non-limiting examples of the computing devices 306 include a server 306a, a desktop computer 306b, a laptop computer 306c, a tablet computer 306d, and a smartphone 306e. However, it should be understood that the aforementioned devices are merely illustrative and other computing devices should also be considered within the scope of this disclosure. At minimum, each computing device 306 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 306.

The network 304 may be any kind of local or remote network that may provide a communication medium between the computing devices 306 and the dye sublimation apparatus 302. For example, the network 304 may be a local area network (LAN), a desk area network (DAN), a metropolitan area network (MAN), or a wide area network (WAN). However, it should be understood that aforementioned types of networks are merely illustrative and any type of component providing the communication medium between the computing devices 306 and the dye sublimation apparatus 302 should be considered within the scope this disclosure. For example, the network 304 may be a single wired connection between a computing device 306 and the dye sublimation apparatus 302.

Figure 4:
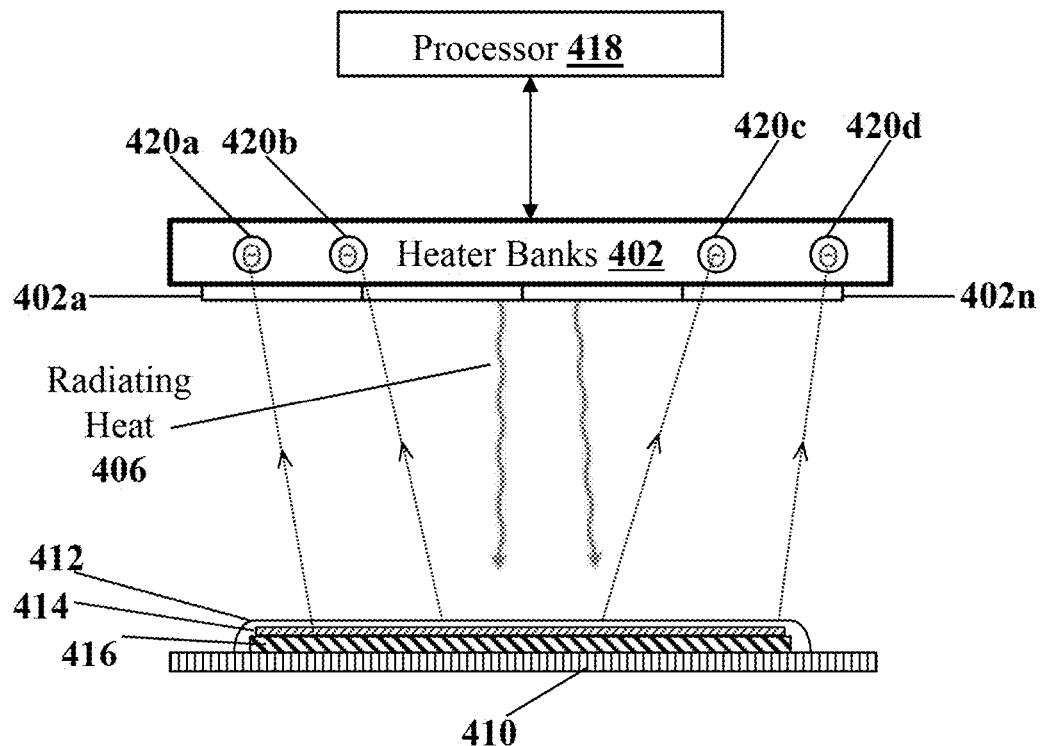
FIG. 4 shows an illustrative heating section of a dye sublimation apparatus, according to an embodiment.

FIG. 4 shows an illustrative heating section 400 of a dye sublimation apparatus, according to an embodiment. It should be understood that the components of the heating section 400 shown in FIG. 4 and described herein are merely illustrative and additional, alternative, and fewer number of components should also be considered within the scope of this disclosure. The heating section 400 may comprise a bank of a plurality of heaters 402a, through 402n (collectively referred to as heater banks 402) that may generate radiating heat (also referred to as radiative heat) 406. The radiative heat 406 may cause dyes in a printed sheet 414 to sublimate and get deposited to a substrate 416 thereby infusing an image in the printed sheet 414 into the substrate 416. As shown, the substrate 416 may be on a bed 410, which may be a conveyer belt and the combination of the printed sheet 414 and the substrate 416 may be under a membrane 412 may be snugly hold the printed sheet 414 and the substrate 416.

The heater banks 402 may include any type of heating element that may generate the radiating heat 406. For example, the heater banks 402 may include an electric heating element such as a heating coil that can be controlled by a controller. As another example, the heater banks 402 may include a chemical heating element that may chemically generate the radiating heat 406. It should be understood that these forms of heating are merely illustrative and any type of mechanism that generates the radiating heat 406 should be considered within the scope of this disclosure.

The heating section 400 may include a plurality of pyrometers 420a, 420b, 420c, 420d (collectively or commonly referred to as 420) that may remotely (e.g., without being mechanically/electrically connected to) measure temperature from the corresponding spots within the heating section 400. The pyrometers 420 may include any type of sensor that may measure the temperature of a spot based upon the radiation generated by the spot. The pyrometers 420 may be arranged within the assembly of the heater banks 402. For example, the pyrometers 420 may be at the gaps between the individual heaters of the heater banks 402.

The pyrometers 420 may have adjustable angular orientation. More particularly, a processor (to be broadly understood to include controllers) 418 may transmit adjustment instructions (or signals) to the pyrometers 420. Each of the pyrometers 420 may have an actuation mechanism (e.g., an electric motor) that may change the angular orientation of the corresponding pyrometer 420. In some embodiments, the processor 418 may arrange the pyrometers 420 in a configuration at the beginning of a sublimation cycle and maintain the configuration throughout the sublimation cycle. For example, the processor 418 may determine one or more critical spots within the printed sheet 414 for a particular image pattern or heater banks 402 configuration and orient the pyrometers 420 to point to the critical spots. The processor 418 may maintain such configuration throughout the sublimation cycle because the position of the critical spots may not change. In other embodiments, the processor 418 may dynamically configure the angular orientation of the pyrometers 420 during the sublimation cycle. For example, as the printed sheet 414 moves through the heating section 400, the locations of the critical spots may move also move. The processor 418 may also cause the pyrometers 420 to track the movement of the printed sheet 414. As another example, the processor 418 may first orient a majority of the pyrometers 420 towards the center of the heating section 400 at the beginning of a sublimation cycle when the heating section 400 gradually heats up. Once the center reaches a threshold temperature, the processor 418 may reorient a subset of the pyrometers 420 from the center to the periphery of the heating section 400 to have more measurement spots in the periphery. It should be understood that these are just illustrations of the processor 418 dynamically configuring the angular orientation of the pyrometers 420 and should not be considered limiting. It should further be understood that the aforementioned description of configuring the angular orientation of the pyrometers 420 is merely for illustration and the processor 418 may cause other configuration movements of the pyrometers 420. For example, the processor 418 may cause the one or more of the pyrometers 420 to move linearly, e.g., within a groove.

The processor 418 may utilize the temperature measurements provided by the pyrometers 420 to regulate the heater banks 402. For example, if the corresponding pyrometers 420 measure a lower temperature at the spots towards the periphery of the heating section 400, the processor 418 may cause the heaters towards the periphery to increase the radiating heat 406. Generally, there may be a continuous feedback-control loop between the pyrometers 420, the processor 418, and the heater banks 402.

It should be understood that the above description of the pyrometers 420 within the heating section 400 is merely for illustration and should not be considered limiting. The dye sublimation apparatus may have pyrometers 420 in the cooling section as well. The pyrometers 420 in the cooling section may measure the temperature of the printed sheet 414 or the membrane 412 in the cooling section as the combination of the printed sheet 414 and the substrate 416 cools down. These measurements may be provided to the processor 418 (or any other processor) that may control the cooling elements (if any) in the cooling zone. For example, the cooling zone may have air blowers (as cooling elements) and the processor 418 may use the temperature measurements from the pyrometers 420 in the cooling section to control the air blowers.

Figure 5A:
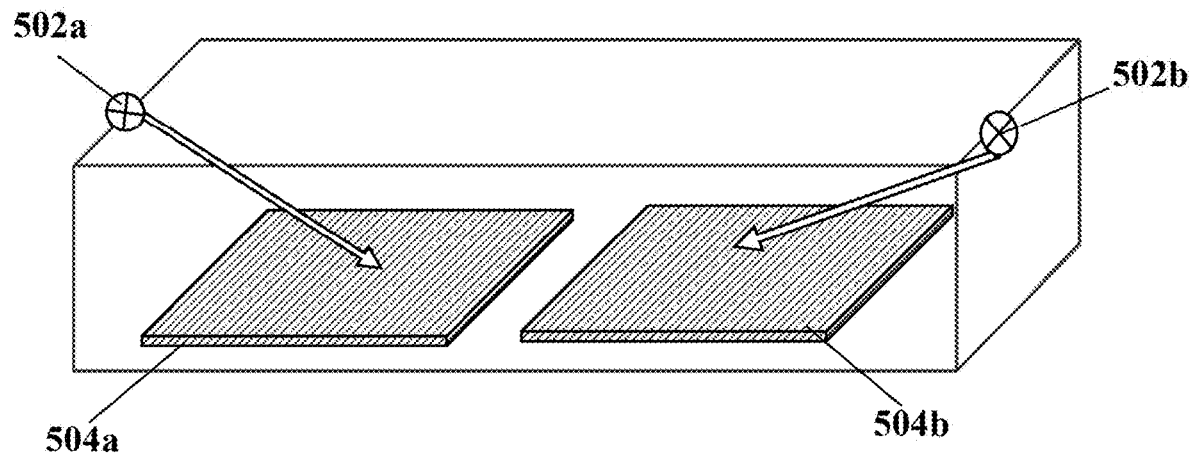
FIG. 5A shows an illustrative heating section of a dye sublimation apparatus, according to an embodiment.

FIG. 5A shows an illustrative heating section 500 of a dye sublimation apparatus, according to an embodiment. As shown, the heating section may include pyrometers 502a, 502b to measure the temperature of the corresponding printed sheets 504a, 504b. A processor (broadly defined to include both microprocessors and controllers) may configure the angular orientation of each of the pyrometers 502a, 502b to measure the temperature at the corresponding spots on the printed sheets 504a, 504b. In some embodiments, the processor may maintain a static configuration of the angular orientations of the pyrometers 502a, 502b throughout a sublimation cycle. In other embodiments, the processor may dynamically configure the angular orientations of the pyrometers 502a, 502b during the sublimation cycle.

Figure 5B:
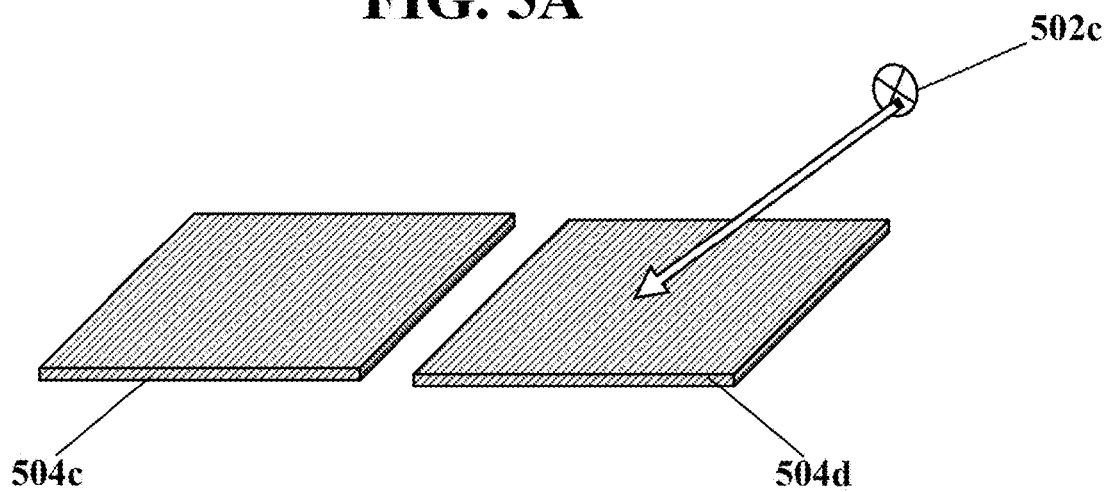
FIG. 5B shows an illustrative cooling section of a dye sublimation apparatus.

FIG. 5B shows an illustrative cooling section 506 of a dye sublimation machine, according to an embodiment. As shown, the cooling section may include a pyrometer 502c that may measure the temperature of a plurality of spots of the printed sheets 504c, 504d. A processor may control the angular orientation of the pyrometer 502c such that the pyrometer 502c measures the temperature of multiple spots within the printed sheet 504d. Furthermore, the processor may control the angular orientation of the pyrometer 502c such that the pyrometer 502c measures the temperature of multiple spots within the printed sheet 504c. It should be understood that in some embodiments, the processor may maintain a static configuration of the pyrometer 502c throughout the cooling process and in other embodiments, the processor may dynamically change the configuration of the pyrometer 502c during the cooling process.

Figure 6:
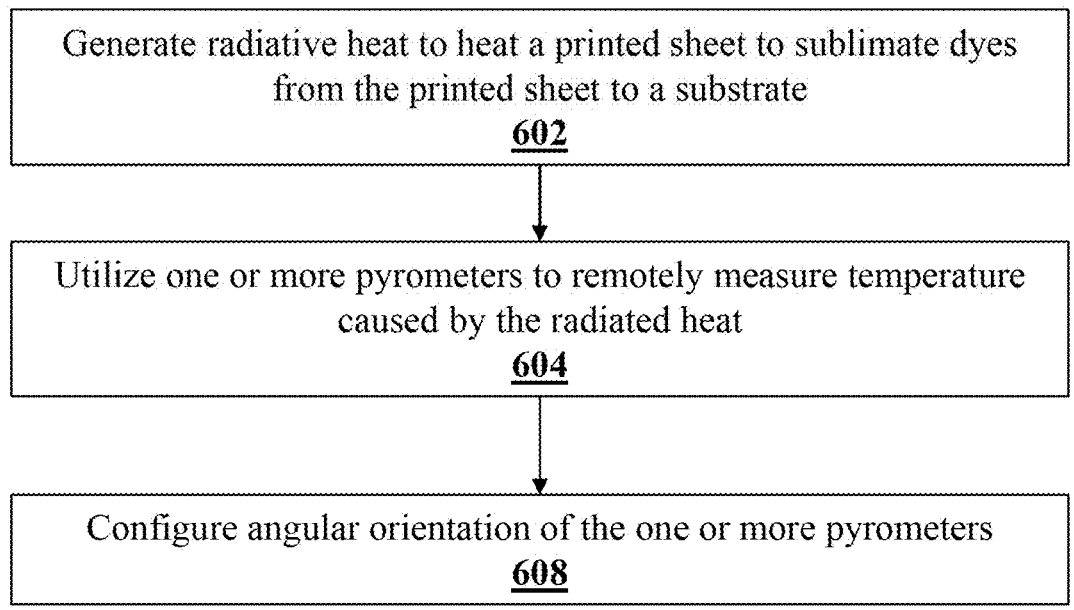
FIG. 6 shows a flow diagram of an illustrative method for dye sublimation, according to an embodiment.

FIG. 6 shows a flow diagram of an illustrative method 600 for dye sublimation, according to an embodiment. The steps of the method 600 described herein are merely illustrative and methods with alternative, additional, and fewer number of steps should also be considered within the scope of this disclosure.

The method may begin at step 602 where a plurality of heating elements may generate radiative heat (also referred to as radiating heat) to heat a printed sheet to sublimate dyes from the printed sheet to a substrate. The heating elements may be within a heating section of a dye sublimation apparatus (also referred to as a dye sublimation machine) configured as bank of heaters. Generally, the heating elements may radiate the heat downward towards the printed sheet that may be pressed onto a substrate using a vacuum pulled membrane.

At step 604, one or more pyrometers may remotely measure temperature caused by the radiative heat. More specifically, the one or more pyrometers may be oriented towards one or more locations (e.g., pointing at the one or more locations) to measure the temperature of the one or more locations. The one or more pyrometers may measure the temperature remotely, e.g., without having a mechanical and/or electrical contact with the one or more locations.

At step 606, a processor may configure an angular orientation of each of the one or more pyrometers. It should be understood that the term "processor" as used herein may include microprocessors that generate control instructions and controllers that generate control signals. In some embodiments, the processor may maintain a static configuration of the angular orientation of the one or more pyrometers during a sublimation cycle. In other embodiments, the processor may dynamically configure the angular orientation of each of the one or more pyrometers during the sublimation cycle.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A dye sublimation apparatus for infusing an image on a printed sheet to a substrate, the dye sublimation apparatus comprising:
    a heating section configured to heat the printed sheet to sublimate one or more dyes forming the image, such that the one or more dyes travel into the substrate in a gaseous state and deposit into the substrate in a solid state to infuse the image into the substrate, the heating section comprising:
        one or more heaters configured to radiate heat towards the printed sheet; and
        one or more pyrometers with individually configurable angular orientation to remotely measure temperature at corresponding one or more locations within the heating section, and
    a processor configured to transmit control instructions to the one or more pyrometers and receive temperature measurements from the one or more pyrometers.

2. The dye sublimation apparatus of claim 1, further comprising:
    a controller configured to transmit control signals to the one or more pyrometers and receive temperature measurements from the one or more pyrometers.

3. The dye sublimation apparatus of claim 1, wherein the angular orientation of the each of the one or more pyrometers is dynamically changed during a sublimation cycle.

4. The dye sublimation apparatus of claim 1, wherein the angular orientation of each of the one or more pyrometers is statically maintained during a sublimation cycle.

5. The dye sublimation apparatus of claim 1, wherein the one or more pyrometers and the one or more heaters are located in a single assembly.

6. The dye sublimation apparatus of claim 1, wherein the one or more locations within the heating section are on a membrane covering the printed sheet.

7. The dye sublimation apparatus of claim 1, wherein the angular orientation of each of the one or more pyrometers is configured to track a movement of the printed sheet in the heating section.

8. The dye sublimation apparatus of claim 1, wherein the one or more pyrometers are at a top wall of the heating section.

9. A dye sublimation method for infusing an image on a printed sheet to a substrate, the method comprising:
    heating, by a heating section of a dye sublimation apparatus, the printed sheet to sublimate one or more dyes forming the image such that the one or more dyes travel into the substrate in a gaseous state and deposit into the substrate in a solid state to infuse the image into the substrate, the heating section comprising one or more heaters configured to radiate heat towards the printed sheet;
    remotely measuring, by one or more pyrometers of the dye sublimation apparatus, temperature caused by the radiated heat at corresponding one or more locations within the heating section; and
    configuring, by a processor of the dye sublimation apparatus, angular orientation of each of the one or more pyrometers.

10. The dye sublimation method of claim 9, wherein the processor is a microprocessor transmitting one or more control instructions to the one or more pyrometers and receiving temperature measurements from the one or more pyrometers.

11. The dye sublimation method of claim 9, wherein the processor is a controller transmitting one or more control signals to the one or more pyrometers and receiving temperature measurements from the one or more pyrometers.

12. The dye sublimation method of claim 9, further comprising:
    dynamically configuring, by the processor, the angular orientation of each of the one or more pyrometers during a sublimation cycle.

13. The dye sublimation method of claim 9, further comprising:
    statically maintaining, by the processor, the angular orientation of each of the one or more pyrometers during a sublimation cycle.

14. The dye sublimation method of claim 9, wherein the one or more pyrometers and the one or more heaters are located in a single assembly.

15. The dye sublimation method of claim 9, wherein the one or more locations within the heating section are on a membrane covering the printed sheet.

16. The dye sublimation method of claim 9, further comprising:
    configuring, by the processor, wherein the angular orientation of each of the one or more pyrometers is configured to track a movement of the printed sheet in the heating section.

17. The dye sublimation method of claim 9, wherein the one or more pyrometers are at a top wall of the heating section.

18. A dye sublimation apparatus for infusing an image on a printed sheet to a substrate, the dye sublimation apparatus comprising:
- a heating section configured to heat the printed sheet to sublimate one or more dyes forming the image, such that the one or more dyes travel into the substrate in a gaseous state and deposit into the substrate in a solid state to infuse the image into the substrate; and
- a cooling section comprising:
  - one or more cooling elements configured to cool the substrate; and
  - one or more pyrometers with individually configurable angular orientation to remotely measure temperature at corresponding one or more locations within the cooling section, and
- a processor configured to transmit control instructions to the one or more pyrometers and receive temperature measurements from the one or more pyrometers.

* * * * *